United States Patent

[11] 3,547,452

[72] Inventor Michiho Hirata
 Saitama-ken, Japan
[21] Appl. No. 792,078
[22] Filed Jan. 17, 1969
[45] Patented Dec. 15, 1970
[73] Assignee Nippon Oil Seal Industry Co., Ltd.
 Tokyo, Japan
 a company of Japan

[54] PROPELLER SHAFT SEAL
 2 Claims, 1 Drawing Fig.
[52] U.S. Cl............................................. 277/92,
 277/30, 277/9, 277/65
[51] Int. Cl...................................... F16j 15/38
[50] Field of Search............................ 277/30, 92

[56] References Cited
UNITED STATES PATENTS
3,372,940  3/1968  Keller............................ 277/92
3,447,810  6/1969  Porter........................... 277/92
3,452,995  7/1969  Engelking..................... 277/92

Primary Examiner—Benjamin W. Wyche
Attorney—Holman, & Stern

ABSTRACT: A propeller shaft seal comprising a pair of seal elements each of which includes a seal cover having on one side an annular groove in which a seal ring is mounted on radially outer and inner resilient rings.

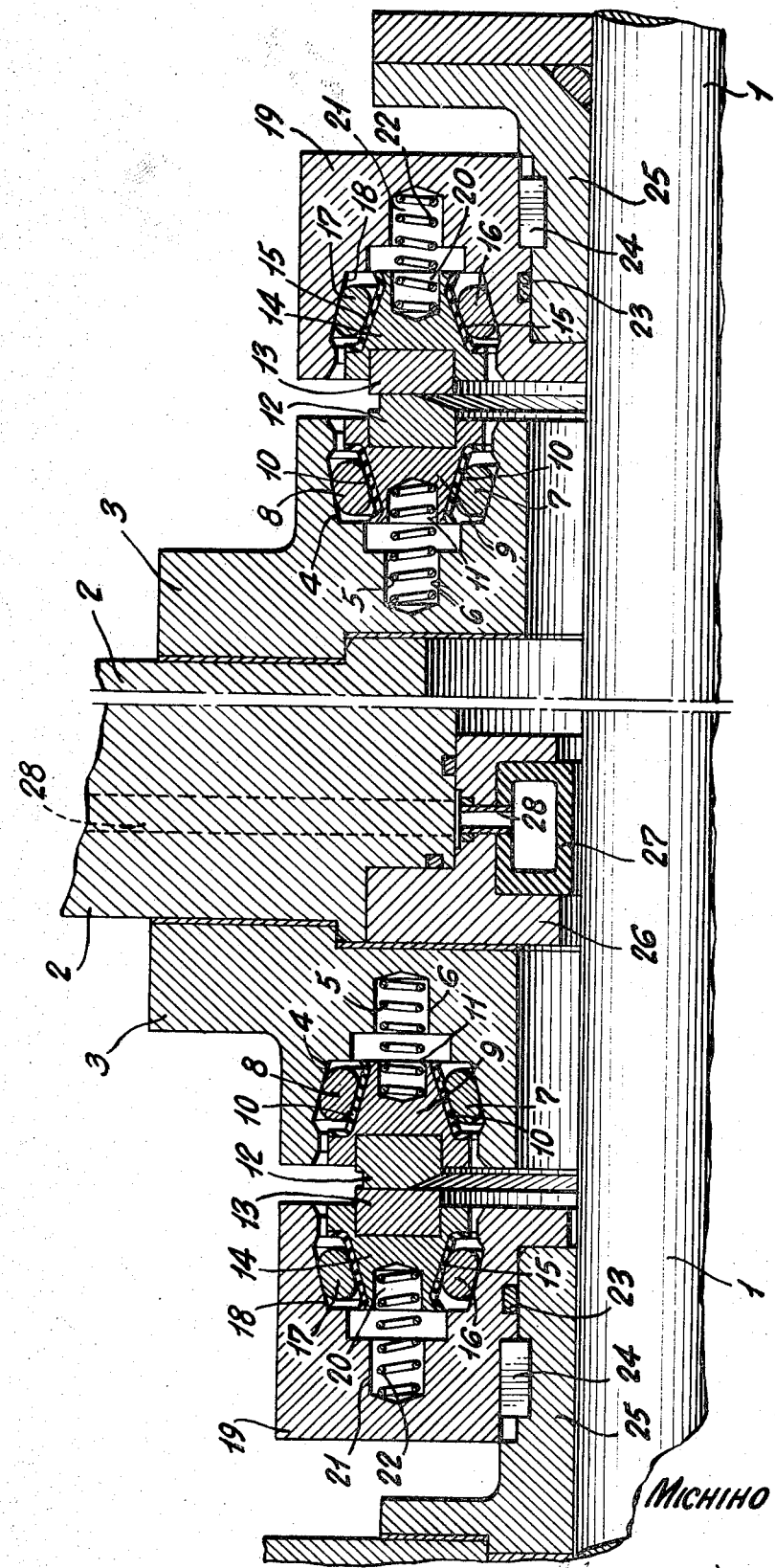

3,547,452

PROPELLER SHAFT SEAL

BACKGROUND OF THE INVENTION

The present invention relates to a propeller shaft seal, more particularly to a propeller shaft seal of the type which performs a sealing function by face to face contact of two relatively rotating rings resiliently held by means of annular rings.

Usually, in sealing the propeller shaft in the stern of a ship two propeller shaft seals are sued, one on the stern side of the shaft, called the front seal, the other on the propeller side of the shaft, called the rear seal, with a cylindrical bearing interposed therebetween. There are two main types of propeller shaft seals heretofore known. One is the lip type which effects a seal with one or more lips made of resilient material such as synthetic rubber, the other the mechanical seal type which utilizes two seal rings of rigid material such as metal rotating relatively to each other in sealing contact.

Propeller shaft seals heretofore used, however, have failed in achieving a satisfactory sealing effect. Reasons for their failure can be said to be, in case of the lip type, that the nature of the material is unable to endure a long operation under severe conditions including attack by sea water and high pressure as met in submarines, or that rubber lips are inevitably poor in following the radial displacement of the associated parts, and in case of the mechanical seal type, that the perfect perpendicularity of the rubbing seal faces in relation to the axis of the rotation of the propeller shaft is hard to maintain or that two rubbing seal faces often run out of contact because of the vibration or the eccentric rotation of the propeller shaft.

One of the objects of the present invention is, therefore, to provide a propeller shaft seal which has a long life of operation.

Another object of the present invention is to provide a propeller shaft seal in which two rubbing seal rings, that is the parts of the seal which perform a sealing function, are resiliently held against the possible vibration or eccentric rotation of the propeller shaft.

Still another object of the present invention is to provide a propeller shaft seal in which two rubbing seal rings are arranged, through annular rings, always to keep the contact of the seal rings even in the case of a plane of contact angled to the axis of rotation of the propeller shaft by abnormal movement of the propeller shaft or by misalignment of the seal.

A further object of the present invention is to provide a propeller shaft in which the transmission of heat generated by the rubbing contact of two seal rings to the associated parts is prevented.

SUMMARY OF THE INVENTION

The invention consists in a propeller shaft seal consisting of a pair of seal elements, each seal element comprising in combination, a seal cover through which the shaft can be threaded, the seal cover having an annular groove, an annular seal retainer rigidly holding a sealing ring having a sealing face, the seal retainer being mounted in the groove on a radially inner resilient ring and a radially outer resilient ring, spring means exerting an axial force between the retainer and the seal cover, with one of the seal elements being mounted on the shaft, and the other of the seal elements against rotation, and the sealing faces being in sealing contact.

The faces of the seal retainer adjacent to the resilient rings may be coated with heat insulating material.

BRIEF DESCRIPTION OF THE DRAWINGS

The invention will be further described with reference to the sole FIG. of accompanying drawing which illustrates in cross section an embodiment thereof given by way of example and not by way of limitation.

DETAILED DESCRIPTION OF THE INVENTION

The drawing shows two seals according to the invention applied on the inside and outside respectively of the stern of a ship. In the drawing a propeller shaft 1 carries a propeller at its left hand end and passes through an aperture in the stern 2. Two seal covers 3 are fixed on the inside and outside of the stern respectively by means of bolts and gaskets.

Since each seal is of the same construction, a single seal will be referred to in the following description. An annular groove 4 of substantially trapezoidal radial cross section and holes 6 for receiving springs 5 near the apex of the trapezium are formed in the cover 3. A seal retainer 9 of substantially trapezoidal cross section is supported by radially inner and outer resilient annular rings 7 and 8 respectively. The inner and outer tapered surfaces of the retainer 9 have a heat insulating coating 10 of rubber or synthetic material which is treated to resist oil and sea water. Opposite the spring receiving hole 6 in the seal cover 3 similar holes 11 are formed in the retainer 9 to receive the other end of the spring 5. A stationary seal ring 12 is fixed to the other side of the retainer.

A rotatable seal ring 13 in rubbing seal contact with the stationary seal ring 12 is mounted on the propeller shaft 1 by a similar arrangement comprising a seal retainer 14 having a heat insulation coating 15, radially inner and outer resilient annular rings 16 and 17 respectively, a seal cover 19 having an annular groove 18, and springs 22 interposed between receiving holes 20 and 21. The seal cover 19 is keyed on the propeller shaft 1 by means of a sleeve 25 on which the seal cover is fixed by a ring 23 and keys 24.

The sealing contact pressure, i.e. the load on the sealing surfaces between the seal rings 12 and 13, is imparted mainly by the springs 5 and 22 and only to a small extent by the annular rings 7, 8, 16 and 17. The coatings 10 and 15 prevent the annular ring 7, 8, 16 and 17 from being aged by wide variations in temperature.

For use in the case of seal failure or during replacement of a seal, a cover 26 is sealingly fixed to the inner surface of the aperture in the stern 2. An expansion tube 27 surrounds the shaft 1 and is sealingly attached to the cover 26. Air supplied at high pressure to the expansion tube 27 by pipe 28 forces the inner surface of the expansion pipe 27 into sealing contact with the shaft 1.

During operation of the propeller shaft 1, if the rotating shaft 1 moves radially relative to the stern, the rubbing seal faces between the seal rings 12 and 13 slide relatively radially and remain in sealing contact.

If the rotating shaft 1 moves axially relative to the stern, one of the sets of springs 5 and 22 is compressed and the other expanded, with the seal retainers 9 and 14 accordingly moving in the axial direction and the seal rings 12 and 13 remaining in contact. At the same time, the annular rings 7, 8, 16 and 17 roll on their contacting tapered surfaces to support sealingly the seal retainers 9 and 14.

If the rotating shaft 1 inclines relative to the longitudinal axis of symmetry, rubbing seal face 29 also inclines since the seal retainers 9 and 14 incline by rolling on the annular rings 7, 8, 16 and 17.

Thus, no matter how the rotating shaft moves, frictional loss is reduced and damage of the seal face 29 is prevented.

The construction is simple and consequently robust.

I claim:

1. In a propeller shaft seal, a pair of sealed elements, each seal element comprising in combination a seal cover having an annular groove, a shaft threaded through the seal cover, a sealing ring having a sealing face, an annular seal retainer having radially inner and outer surfaces, said retainer rigidly holding the sealing ring, two resilient rings, the seal retainer being mounted in the groove of the seal cover on the resilient rings, one ring contacting the radially inner surface of the retainer, the other ring contacting the radially outer surface of the retainer, and spring means exerting an axial force between the retainer and the seal cover, one of the seal elements being fixed on the shaft and the other of the said elements being mounted against rotation, with the sealing faces being in sealing contact.

2. The propeller shaft seal as claimed in claim 1, in which the inner and outer surfaces of the seal retainers are provided with a coating of heat insulating material.